July 21, 1942.  H. A. BRASSERT  2,290,734
MANUFACTURE OF METAL PRODUCTS
Filed Feb. 14, 1940  2 Sheets-Sheet 1
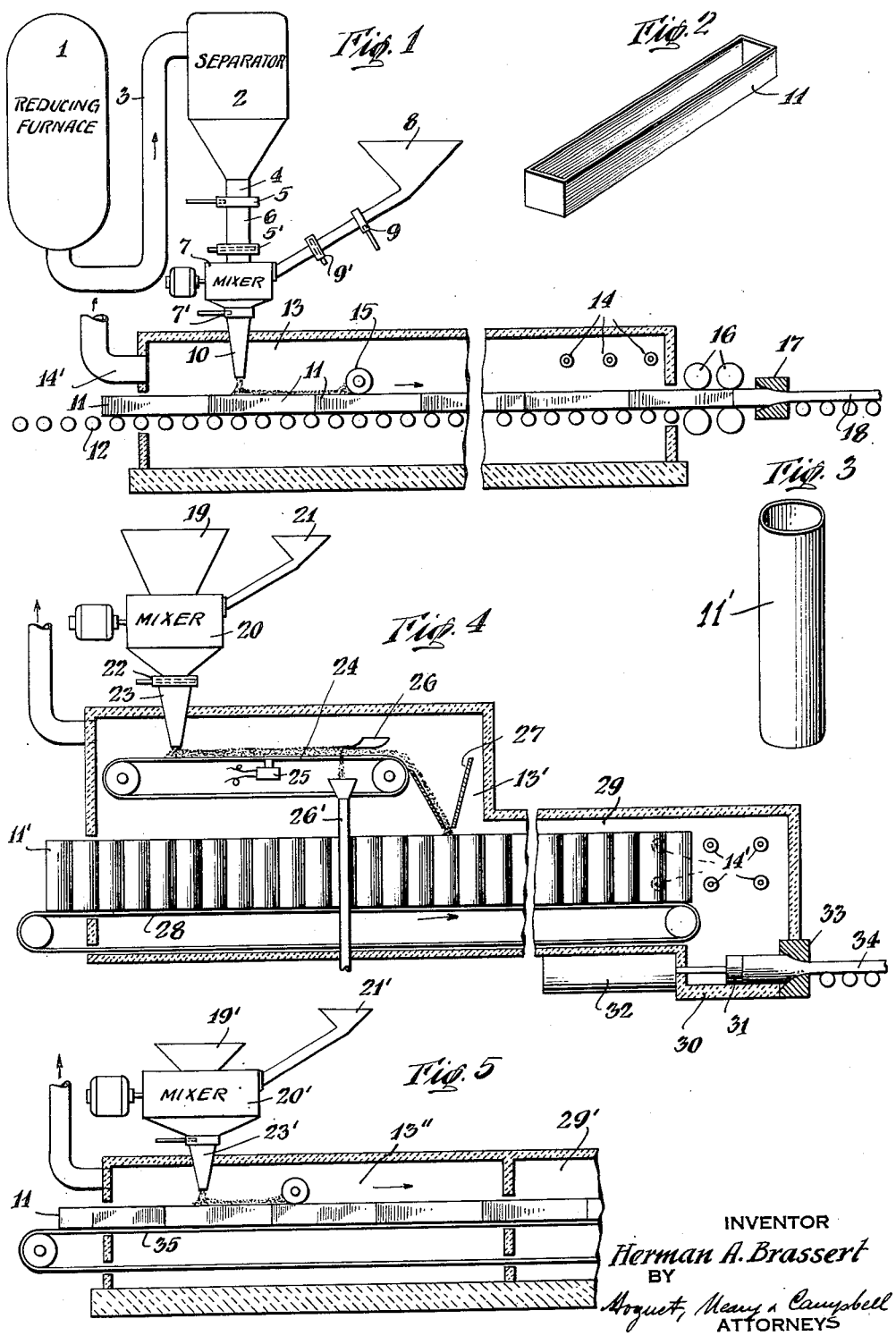
INVENTOR
Herman A. Brassert
BY
Boquet, Meany & Campbell
ATTORNEYS July 21, 1942. H. A. BRASSERT 2,290,734
MANUFACTURE OF METAL PRODUCTS
Filed Feb. 14, 1940 2 Sheets-Sheet 2
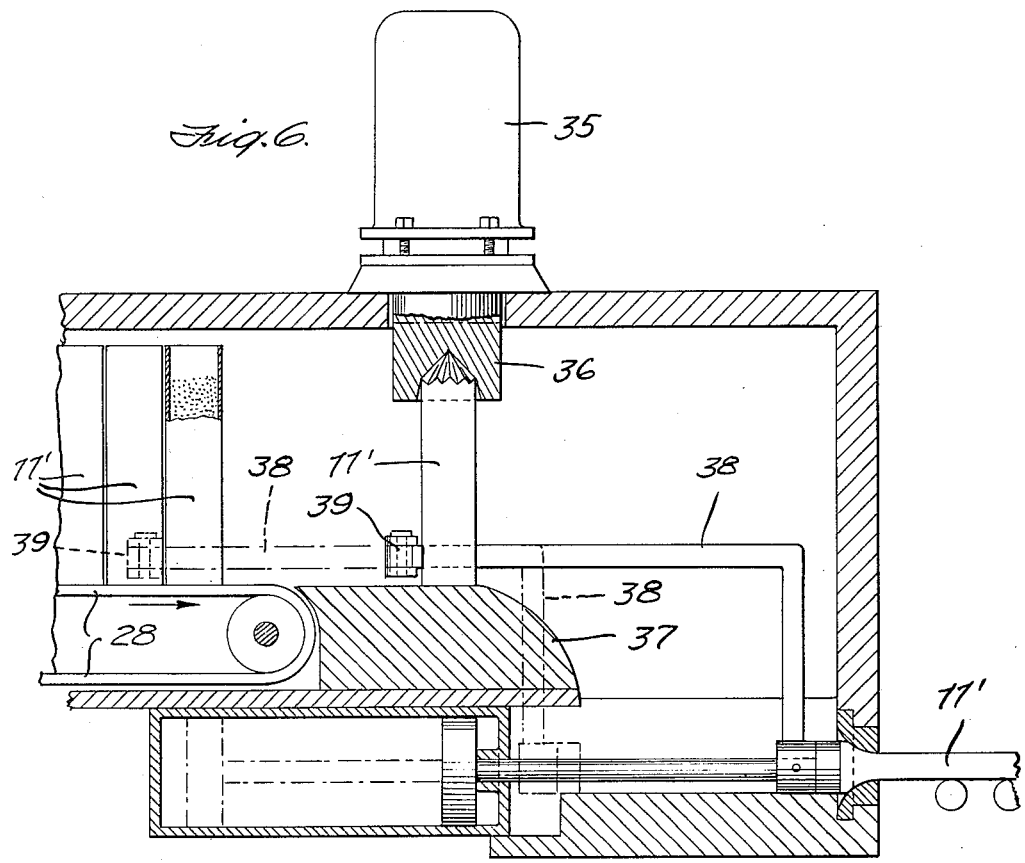
INVENTOR
HERMAN A. BRASSERT
BY
ATTORNEY Patented July 21, 1942

2,290,734

UNITED STATES PATENT OFFICE 2,290,734

MANUFACTURE OF METAL PRODUCTS

Herman A. Brassert, New York, N. Y., assignor to Minerals and Metals Corporation, New York, N. Y., a corporation of Delaware Application February 14, 1940, Serial No. 318,814

2 Claims. (Cl. 75—22)

This invention relates to the economical large scale manufacture direct from the ores, without subjecting them to the molten state, of metal products made of iron and steel as well as of non-ferrous metals, such as billets, bars, shapes, sheets, tubes, rods, wire and the like having superior physical and chemical properties.

It was suggested many years ago to reduce crushed iron ore mixed with coal or other reducing agents in containers, heat the containers and forge or hammer them into blooms for subsequent forming into finished iron products. In practice this method was not successful because the arts of fine grinding, separation, mixing, compacting, and heat control during working of the metal, were not sufficiently developed to produce a uniform body of sufficient structural strength to withstand forging and rolling or to be useful as a structural product when finished. Neither was it possible to produce iron or steel directly from the ore in commercial quantity commensurate with economical steel works practice, which is one of the principal objects of this invention, the old methods being too slow and uneconomical.

Another object of this invention is to produce directly from the ore in a continuous heat process, without melting the material, semi-finished and finished iron and steel products in solid homogeneous form and of superior chemical and physical properties as compared to the present ordinary commercial grades of steel.

Another object of this invention is to separate the pulverulent ore from the gangue, reduce the ore without fusion and work it in conjunction with metal like that of the reduced ore into iron and steel products of high physical and chemical quality.

Another object is to produce iron and steel products directly from the ores by reducing the oxides to metals and hot-working them, such as extruding, rolling, forging, or drawing into the semi-finished and finished products.

Another object is to produce directly from the ores in one heat, semi-finished products of iron and steel and other hot-workable metals.

Another object is to produce from reduced iron ore powder semi-finished and finished steel products having a fine and dense grain structure, and of transverse tensile strength substantially equal to the longitudinal tensile strength.

Another object is to produce directly from the ores solid metallic bodies by reducing the oxides under vibration, then hot-working them into shape.

Another object of the invention is to accelerate reduction of iron and other ores admixed with carbon or hydrocarbons, by vibrating the mixture while heating it.

These and other objects of the invention are successfully attained by selecting for the process either a very pure ore, such as exists in some of the high grade ore deposits, and grinding such ore to a very finely-divided pulverulent state, preferably so that all of it will pass through a 100 mesh screen. If ores of great natural purity, which means with less than 2% of gangue, and low in objectionable elements such as sulphur and phosphorus, are not available, then such ores must be selected which can be beneficiated to this degree of purity, which is generally accomplished by the same fine grinding followed by magnetic concentration, air or liquid flotation or other known methods of separation. If it is desired to produce very high grade metals, then the ore must be ground still finer, for instance to the 200 or even 400 mesh size.

In one form of the invention, this concentrated ore powder is reduced in the presence of reducing gases, or substantially pure carbon, or both, at the proper temperature but without fusion and under such conditions that the reduced ore is recovered in very pure form and still preferably in powdered condition. A further concentration step may be performed if necessary, by dry jigging, as taught herein, or by any of the known methods of concentration. The purified reduced ore powder is then placed in containers made of the same material as the reduced ore, with or without the admixture of powdered, plastic or fluid fluxes, or modifying materials such as alloying metals and the like, and the container and its contents brought to the consolidation temperature, which in most cases is approximately the welding temperature, and then directly working the whole while in this proper heated state into finished or semi-finished metal products, by extruding, rolling, forging, drawing, or combinations of these steps.

In another form of the invention, the purified powdered ore, in this case iron ore, is uniformly admixed with carbon as pure as commercially obtainable, such as carbon black, pitch, substantially ash-free coal or charcoal, and the like, powdered to substantially the same degree of fineness as the ore powder, or finer, or ground therewith to secure intimate admixture and uniform fineness. Fluxes or modifying agents, substantially as finely powdered as the ore powder, or finer, may be intimately admixed therewith, as described. The mixture is placed in containers made of the same material as the reduced ore, heated to the reduction temperature of the ore, while vibrating the containers for rapid completion of the reduction process, and then brought to a much higher temperature, namely, that at which the container and the reduced particles can be readily extruded, forged, rolled, or otherwise shaped into semi-finished or finished products with or without heating to the welding temperature before any of those working steps.

It will be seen that by means of this invention, the purest metal, such as steel, can be produced, as no impurities will be absorbed by the metal as is the case when a melting process is used, wherein undesirable elements, such as an excess of carbon when the blast furnace is employed, or sulphur or phosphorus or other detrimental materials are absorbed by the molten metal. For instance, if the original ore contains under .01% phosphorus, the finished steel will contain under .01% phosphorus, which is a most important qualification for many of the highest grade steels. If there is only a trace of sulphur in the original ore and a sulphur-free reagent is used for the reduction, then the final iron or steel product will contain only a trace of sulphur. Also the physical qualities will be much better than in metal made by a molten process, as the grain structure will be much finer, due to the fine grinding of the material and there will be no segregation or piping, which invariably occurs when metal is poured molten into a mould and solidifies therein. Also, the inherent grain structure resulting from compacting a powder permits extrusion to be practiced directly and thereby creating transverse tensile strength substantially equal to the longitudinal tensile strength.

For a more complete understanding of the invention, reference may be had to the accompanying drawings, in which:

Figure 1 is a diagrammatic representation of one form of apparatus for conducting the process of this invention;

Fig. 2 is a perspective view of a typical form of container used in the apparatus;

Fig. 3 is a perspective view of a modified form of the container;

Fig. 4 is a diagrammatic representation of another form of apparatus for conducting the process of this invention; and, Fig. 5 is a diagrammatic representation of a third form of apparatus for conducting the process of this invention.

Figure 6 is a modified detail of the right hand end of the apparatus shown in Figure 4 having embodied therein means for upsetting the tops of the containers to effect a substantial sealing thereof before extrusion.

An example of the material to be treated is preferably a highly concentrated or pure ore which is reduced to sponge iron in powdered form in the process of this invention. The chief raw material source of sponge iron is rich iron ore, generally magnetite or hematite, which is crushed and then pulverized, as by grinding to a fineness such that the valuable portion of the ore may be readily freed from the gangue, which is associated therewith. Depending upon the ore, the degree of pulverization is preferably such that it will pass a 100 mesh sieve. If higher grade products are required the ore must be ground still finer, such as to 200 or even up to 400 mesh size. The gangue is then separated from the remainder of the ore in any suitable way, such as by magnetic separation for magnetite ore, jigging or flotation for hematite and other non-magnetic ores, or other method of beneficiation. If the raw ore is in the form of iron sands, they may be concentrated in these or other ways directly without the crushing step, although fine grinding is necessary in most instances.

In the diagrammatic apparatus shown in Fig. 1, the concentrated and cleaned ore powder is charged into a furnace 1 where it is reduced by gaseous, liquid or solid fuel in a reducing atmosphere without fusion or melting the powdered material, according to known processes. The reduced or powdered material is then carried by the gases, preferably in a reducing atmosphere, to a collector 2 through the duct 3 where the reduced ore powder is further separated from the gangue, or ash if solid fuel is used. In this way the reduced ore may be concentrated with substantially entire elimination of the impurities because of the difference in specific gravity between them, the reduced ore being precipitated first by reason of its greater specific weight and the latter being carried along in the stream of gases out of the separator. The reduced ore is thus recovered as a finely-divided powder or sponge, which if not sufficiently finely-divided may be ground to 100 mesh size, for example, and may be subjected to another magnetic concentration or flotation step if desired. Alternatively, if the iron is treated in the reducing furnace in lump form it may be ground to the proper fineness in the reduced form in which hematites, for instance, become magnetic and can then be concentrated magnetically.

The reduced ore powder, while still hot, is supplied by gravity from the separator 2 through duct 4, through normally open gate 5 into a measuring chamber 6 formed in the duct between normally closed gate 5' and normally open gate 5. When the measuring chamber 6 is filled, gate 5 is first closed and then gate 5' is opened to discharge the measured quantity, the volume of which depends upon the capacity of the containers to be described.

The measured quantity of the reduced ore may have admixed therewith if desired, certain modifying agents, such as soda, fluorspar, or other fluxes for the purpose of combining with the remnant of impurities left in the powder to be squeezed out in the process of extruding, rolling, or forging, such fluxes having a substantially lower melting point than the metals and being as finely-divided as the ore powder, or plastic or liquid; or carbon, silicon, sulphur, or other elements desired in the finished steel may be added in powder form to the reduced ore; or manganese, titanium, nickel, chromium or other metals or alloys of such metals with iron or with each other in the form of powder, or reducible compounds of such metals or elements, may be admixed with the reduced iron powder for the production of alloy steels; or carbon alone may be added beyond that specified in the finished steel for the purpose of reducing to CO the oxygen in the air entrained in the powder.

If these agents are to be added to the reduced ore powder, it is discharged from measuring chamber 6 into mechanical mixer 7 having its beater or other mixing device driven by an electric motor, or the like. The agents are added to the mixer 7 by means of a hopper 8 through gates 9 and 9' provided for measuring the quantity to be added and at the same time precluding the ingress of air. The mixing is intimate, so that the agents are uniformly distributed through the reduced ore powder in mixer 7. The quantity of these agents is usually relatively small, but may be as great as required, and if relatively great, the measuring device 6 is adjusted to compensate for the added quantity so as to maintain the proportion of size of charge to the volume of the container to be described. Alternatively, the measuring device 6 may be placed after the mixer 7, and if agents are not to be added, the mixer 7 is not used. As aforementioned, these agents, if solid materials, are at least as finely ground as the reduced ore powder, and if desired or more convenient, the agents may be ground with the concentrated and cleaned reduced ore.

The reduced ore powder is delivered from the mixer 7 through an automatically controlled gate 7' and spout 10 into a container 11 formed of metal having similar characteristics. For example, for the production of low carbon steel, the container 11 is formed of steel of comparable and preferably of identical characteristics and chemical analysis, for instance, as previously made by the same process. The container must be sufficiently strong, preferably of rolled sheet iron on the order of one-eighth of an inch thick for a container approximately six inches square and from four to six feet long. The containers may have fine perforations in order to allow the easy escape of gases and slag. The empty containers are preferably fed in longitudinal contact with each other endwise in single or multiple by gravity along a slightly inclined roller conveyor 12 or driven belt conveyor, or pushed or by other suitable conveying means, into a heating furnace 13 in which there is preferably maintained a non-oxidizing atmosphere to preclude oxidation of the reduced ore powder and other admixed materials. The furnace 13 may be heated in any desirable way, and is preferably a counterflow tunnel furnace in which the combustion gases from burners 14 at the discharge end traverse the furnace in a direction counter to the movement of the containers 11 therethrough to discharge at the inlet end through duct 14', at gradually decreasing temperature. The containers 11 are preferably heated to approximately the temperature of the finely-divided material issuing from spout 10 by the time the containers reach the spout. The rate of travel of the containers 11 is such that the measured quantity of the powder issuing from spout 10 is distributed evenly in the container and as the container moves along the conveyor 12 a smoothing and pressing roll 15 compacts the material and levels it with the top of the container 11. The speed of the conveyor 12 is synchronized with the operation of gate 7', preferably automatically in a known manner, so that each container 11 is fully charged with the measured quantity while it passes under spout 10.

As the filled containers progress through the described heating furnace 13, the several heating stages therein gradually increase the temperature of containers and powder so that when they emerge from the final heating stage their contents are heated to the temperature required to consolidate the grain structure throughout the material in the container 11. By way of example, for pure sponge iron of a particle size passing a 100 mesh screen, the temperature would be up to approximately 2800° F. At this temperature the contacting particles, including the container, soften and are in condition for welding together, but the mass does not melt.

After being heated to the required temperature in furnace 13, each heated container-billet 11 is transferred by conveyor 12 directly to driven feeding rolls 16 which force it through converging extrusion die 17 in which the particles and the container 11 are worked in all directions, both transversely and longitudinally into solid unitary billet 18 having an homogeneous structure and having a transverse tensile strength substantially equal to its longitudinal tensile strength by reason of the original pulverulent state and the subsequent working in die 17. The billet 18 may have its physical and chemical characteristics modified as and if desired by modifying material previously added at point 8. The billet 18 with or without further heating, depending on requirements, may then be further worked in suitable conventional equipment into the desired cross-sectional shape, such as rails, bars, rods, plates, sheets, shapes, and the like, or the billets may be supplied to tube mills, wire drawing benches, or any of the well known finishing equipment. Instead of utilizing an extruding operation as provided by die 17, the container 11 and its contents, while heated to the proper working temperature, may be rolled, forged, or swaged in a hammer press or the like, or it may be perforated for tube making, depending upon requirements.

It will be understood that the entire process carried on in the apparatus illustrated in Fig. 1 is continuous without time delays, each step following the preceding one, with all steps preferably automatically synchronized, thus enabling high rates of production and making use of residual heat in every step to eliminate re-heating and reduce to a minimum the amount of fuel required. The process is preferably conducted in a non-oxidizing atmosphere, not only up to and including the feeding spout 10 but also throughout the heating step in the furnace 13, which preferably produces oxygen-free combustion gas as the neutral atmosphere.

If the containers 11 are filled in the presence of air, a small amount of substantially pure carbon, such as carbon black, or low ash coal or charcoal, or other pure carbon, is preferably mixed in mixer 7 with the reduced ore powder to combine with the oxygen in this air to preclude reoxidation of the reduced ore. The resulting carbon monoxide also provides a protecting non-oxidizing atmosphere layer at the surface of the mass in containers 11, so that even if air inadvertently reaches the containers it can do no harm. It will be understood that the amount of carbon added at point 8 is just enough to reduce the oxygen in the air contained in the material as the result of filling in air or other exposure to air before or during filling into containers 11 and is added in addition to any carbon required to fill the specification for carbon in the finished steel.

Instead of measuring the material in chamber 6 or the like, before discharging into the containers 11, the flow through spout 10 may be so correlated to the speed of movement of the containers 11 beneath it that the constantly flowing material from spout 10 fills the containers to the proper level without requiring pre-measuring. Also, if desired, the containers 11 may be provided after filling with covers or lids of the same material as the containers, particularly where the filling takes place in air, and in that case the lid also is provided with perforations to permit the gas to escape, particularly when the material is mixed with charcoal for deoxidizing the air as described.

Instead of using horizontally disposed containers for receiving the material, it is possible, also, to use vertically disposed containers, such as is illustrated in Fig. 3. This type of container 11' is preferably of circular cross-section and formed of the same metal as the metal of the reduced ore powder, and is provided with an open end for receiving the powder from spout 10. Container 11' is passed on conveyor 12 or the like in a vertical position beneath the spout 10, filled thereby with the reduced ore powder and heated substantially to welding temperature in the furnace 13. At the conclusion of the heating operation the container may be passed beneath a ram or drop hammer of the bull-dozer type, having a suitably shaped bottom face which crushes the top of the container 11', thus by this upsetting operation substantially closing and sealing it against loss of the heated material during subsequent deforming operations. As shown in Figure 6 of the drawings, a ram or drop hammer 35 has a recess 36 in its bottom face so shaped that as it moves downward it will turn in from all directions the upper end of the side wall of the container 11'. In this manner the upper end of the side wall of the container 11' will be crimped and crushed down upon the powder to form a closure.

A ledge 37 for supporting the container 11' during the upsetting or top crushing operation is so located that its upper face is in the same plane as the upper face of the conveyor 28 so that the containers will slide readily from the conveyor 28 to the ledge 37. To insure centering of the container beneath the ram 35, any suitable manipulating device 38 may be arranged and timed to move the container into its centered relation to the ram 35. Such a manipulating device may be connected, as shown, to the ram 32 so that as the ram 32 reaches the end of its operative stroke it will have brought a succeeding container into position to have its end closed, this operation serving to move the previously closed container over the edge of the ledge 37 and into position to drop in front of the ram 32 on its return stroke. A pawl 39 adapted to yield when it engages a container 11' on its back stroke may serve to engage and move the end container of the line on the conveyor over the ledge into top sealing position.

In most cases, however, the closing of container 11' is not necessary, for the material, at the deforming temperature, has sufficient cohesive strength to withstand the initial deforming operation in an extrusion die or the like, to which the container 11' is fed, preferably open end first, as will be described.

The direct production of finished metal products according to this invention may be effected without the use of the reducing furnace 1 as such, but instead, the pulverized raw ore, with the gangue and other foreign material substantially removed therefrom by any treatment suited for the beneficiation of the individual ores, is mixed with sufficient pure carbon to completely reduce the iron oxides. The mixture is heated to the required temperature, and the reduced ore powder directly discharged into containers 11 or 11'. Such process may be conducted in the apparatus illustrated diagrammatically in Fig. 4, wherein the pulverized raw ore, cleaned as described, is fed in a measured quantity by hopper 19 to motor-driven mixer 20 where it is intimately mixed with as pure carbon as is economically available, in the proper quantity supplied to mixer 20 through hopper 21. The carbon may be pure carbon black, pitch, substantially ash-free charcoal or coal, or other free carbon in relatively pure form, pulverized as finely as the raw ore, or finer. It will be understood that the proportion of the carbon to the raw ore depends upon the nature of the metal oxides which are to be reduced. Fluxes and/or modifying agents such as alloying metals, heretofore mentioned, ground as fine or finer than the raw ore powder, may also be added to the mixer 20 through hopper 21.

As shown in Fig. 4, the mixture of raw ore powder and carbon is discharged from mixer 20 continuously, or in batches controlled by gate 22, through spout 23 upon a steel belt conveyor 24 which is driven at slow speed and preferably vibrated at high frequency as by a conventional electric vibrator 25 acting directly on the belt 23 so as to keep the particles in constant relative rubbing motion in order to accelerate the reducing reaction. This constant vibration of the particles on belt 24 also causes any remaining small amount of gangue to rise to the surface of the mass on belt 24, by reason of the lower specific gravity thereof so that the gangue may be scraped off at the end of the belt by a diagonally arranged scraper blade 26 to discharge into a hopper 26' for further separation of the collected gangue from any ore and carbon which has been removed with the gangue by blade 26.

Conveyor 24 is enclosed in a heating furnace 13', which is heated in a suitable way, preferably counterflow by burners 14', so that the ore-carbon mixture on belt conveyor 24 is heated to the reducing temperature of the ore, at which the carbon combines with the oxygen in the ore oxides to effect the reduction of the ore without fusion of the same. For the particle size magnetite ore in the example given above the temperature to which the material must be heated in furnace 13' to effect the reduction is approximately 1800° F.

The ore has been reduced by the time it reaches the end of the belt conveyor 24 to be discharged into hopper 27 in the form of pure reduced ore, which is free of ash since pure carbon was used. The hopper 27 discharges the reduced ore into the vertically arranged containers 11' shown in Fig. 3, and the containers 11' and their contents are conveyed into and through the furnace 13' by a belt conveyor 28 at the proper rate in the manner described. Heating of the containers and their contents to or near the welding temperature is performed in second furnace stage 29.

The containers 11' and their contents, so heated, are discharged one-by-one onto a platform 30, along which each container is immediately pushed open end first by a plunger 21, actuated by a hydraulic ram 32, into an aligned tapering die 33 for extrusion into a billet 34, having the characteristics of the billet 18 described in connection with Fig. 1. The operation of ram 32 is synchronized with discharge of the containers 11' by conveyor 28, so that the containers 11' and their contents are so extruded successively as they are deposited on platform 30. The billet 34 is then finished in suitable finishing equipment into the desired shape, with or without an intermediate heating operation. Instead of extrusion in die 33 the containers 11' and their contents may be delivered to rolls, a press, hammer, or the like, as previously described.

Another method by which not only the reducing furnace, but also the reducing processing belt 24 of Fig. 4 is eliminated is illustrated in Fig. 5. The cleaned ore, ground to almost impalpable fineness in order to hasten the reduction process, is fed at measured rate and quantity through hopper 19' to mixer 20' where it is mixed intimately with the pure carbon supplied at measured rate and quantity by hopper 21', the carbon being ground as finely or finer than the raw ore powder. Similarly ground fluxes or modifying agents, as previously described, or both, may be added by hopper 21', if desired.

The mixture is supplied by hopper 22' directly into the containers 11 or 11', which in this case must be well perforated or otherwise vented for the escape of gases. It will be understood that the quantity of carbon is that necessary to reduce the oxides, so that the residue is completely reduced ore without any free carbon remaining.

The containers 11 are moved slowly through the furnace 13" or belt conveyor on which the ore-carbon mixture in containers 11 is heated first to the reducing temperature of the ore, which is in the neighborhood of 1800° F. for iron ore. The carbon combines with the ore oxides to effect the reduction of the ore in situ in the containers 11 without fusion. The containers 11 on the conveyor 35 are preferably vibrated at high frequency, as by vibrating the conveyor belt, so as to accelerate the reaction within the containers 11.

The containers 11 of reduced ore are then carried to a zone of higher temperature in furnace stage 29 where containers and reduced ore contents are brought to the proper temperature to effect the mechanical welded consolidation in rolls, forge or extrusion press, or other equipment for the production of billets in the manner previously described.

Although certain preferred arrangements of apparatus and equipment have been illustrated and described herein, it is to be understood that the invention is not limited thereby or thereto. For instance, any one of several forms of reducing furnaces, if used according to Fig. 1, may be employed instead of the furnace there shown, and described, and other forms of continuous heating furnaces, such as the well known circular type may be used instead of the tunnel type herein described, and likewise other conventional apparatus may be used with equal facility where conditions or requirements so indicate.

From the foregoing description of typical embodiments of the invention, it will be apparent that this invention provides very simple and effective ways of rapidly and continuously and directly converting pulverulent raw ore into solid, dense and homogeneous bodies easily converted into metal products, and that while the process is particularly applicable to the treatment of iron and steel, it is also possible to treat other ferrous or non-ferrous metals or alloys in a similar way. Therefore, the above-described examples of typical embodiments of the processes should be considered as illustrative only and not as limiting the scope of the following claims.

I claim:

1. A continuous process of making semi-finished or finished iron and steel products of uniform grain structure, without a melting step, which consists in reducing finely divided iron ore, substantially freed from gangue, at a temperature below the fusion and sintering temperatures of the reduced iron, forthwith raising the temperature of the freshly reduced iron, in a heated container of the same material, to a welding heat, while maintaining both in a protective atmosphere, and then, while still maintaining the freshly reduced iron and its container in a protective atmosphere, extruding both the container and its iron powder content into a solid of homogeneous structure throughout.

2. A process according to claim 1, in which a preliminary upsetting of the container structure takes place in the protective atmosphere between the heating step and the extrusion step.

HERMAN A. BRASSERT.